UNITED STATES PATENT OFFICE.

FRANZ DIETRICH, OF MURTEN, SWITZERLAND.

IMPROVEMENT IN THE MANUFACTURE OF TARTARIC ACID.

Specification forming part of Letters Patent No. 199,039, dated January 8, 1878; application filed August 18, 1877.

*To all whom it may concern:*

Be it known that I, FRANZ DIETRICH, of Murten, Switzerland, have invented a new and useful Improvement in Manufacturing Tartaric Acid and Tartaric Salts, of which the following is a specification:

This invention has reference to an improved process of treating argols and other residues of wine-making for the production of tartaric acid and its salts.

The main object in the treatment of the argols, lees of wine, and drosses in the manufacture of tartaric acid and similar chemical products has been to clean the tartaric-acid salts contained in said natural products from impurities found therein. This purifying is accomplished with some difficulty, for the reason that the accompanying substances, such as yeast and other organic matter, by their mucilaginous properties, prevent the substances from separating, one from the other.

This difficulty I overcome by exposing the natural residues, for a longer or shorter time, to a temperature of 140° to 170° Celsius. This heating has for its object to partly transform the objectionable substances into an insoluble state, and partly change them in such a manner that they do not further prevent the separation of the substances.

The argols and other residues are heated, without the presence of water or any other liquid substance, in open or closed vessels, either on an open fire or on hot baths, or by steam under pressure, or by superheated steam, or in any other manner by which the required temperature of 140° to 170° Celsius is obtained.

The substances are exposed to the heat in a dry state; but when lees of wine in a liquid state are to be treated, they are preferably heated in a closed copper vessel by means of steam admitted directly into said vessel.

Having thus described the nature of my invention, I wish it to be understood that I do not claim, broadly, the heating of said residues in the process of manufacturing tartaric acid, as I am well aware that this has been effected heretofore by others.

Having thus fully described my invention, I claim as new and desire to secure by Letters Patent—

The process of treating argols and lees of wine, as a preliminary step in the manufacture of tartaric acid, which consists in exposing said residues, in a dry state, to a temperature of 140° to 170° Celsius, as set forth.

In testimony that I claim the foregoing I have hereunto set my hand this 26th day of May, 1877.

FRANZ DIETRICH.

Witnesses:
 F. WIRTH,
 FRANZ HASSLACHER.